United States Patent Office 3,365,512
    Patented Jan. 23, 1968

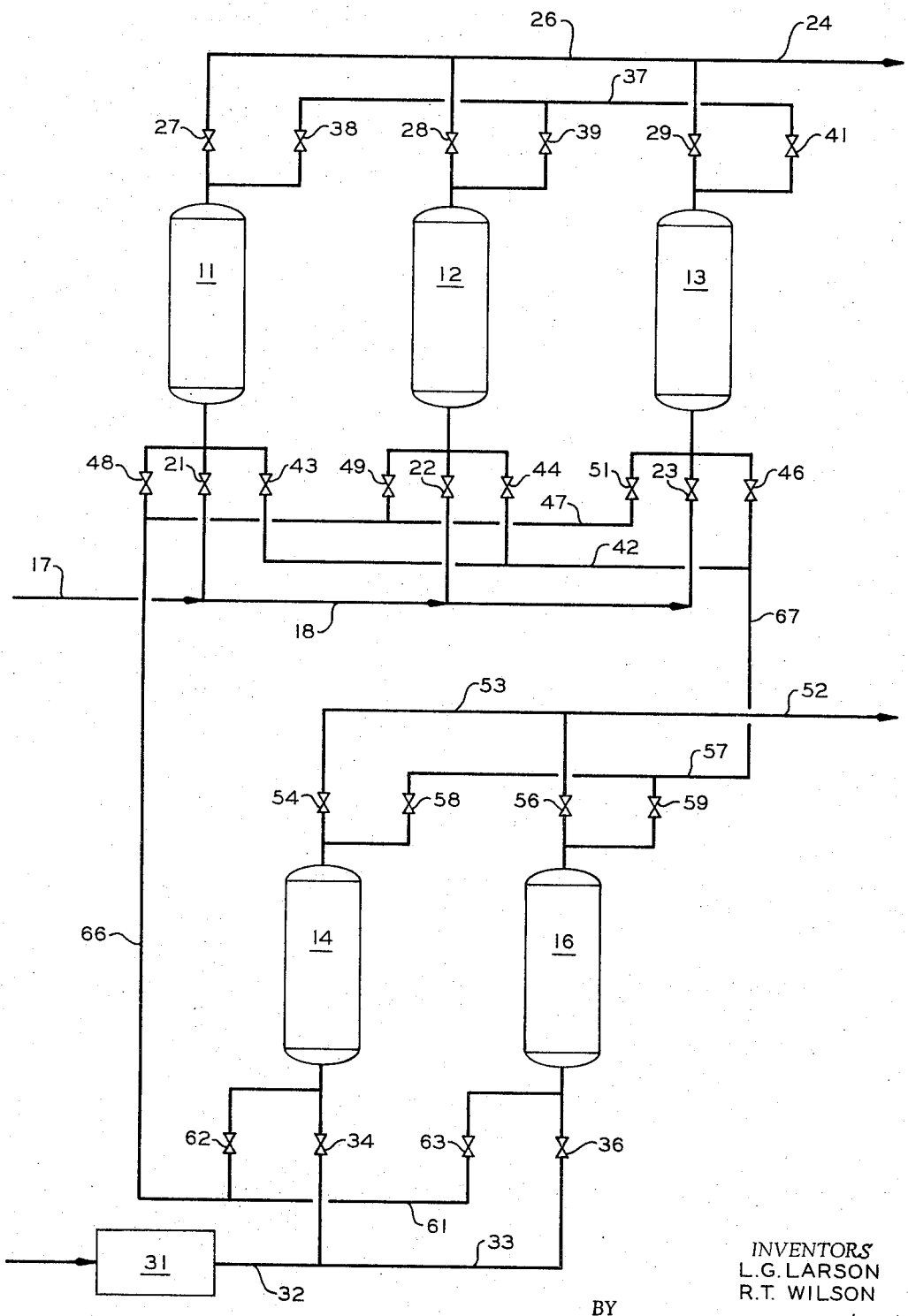

3,365,512
    DEHYDRATION OF A GAS EMPLOYED IN COOLING A CATALYST
    Reagan T. Wilson and Lewis G. Larson, Bartlesville, Okla., assignors to Phillips Petroleum Company, a corporation of Delaware
    Filed Sept. 23, 1964, Ser. No. 398,651
    4 Claims. (Cl. 260—683)

ABSTRACT OF THE DISCLOSURE

Regenerated catalyst is cooled with a gas which has been dehydrated by passing through a cool bed of spent catalyst.

---

This invention relates to dehydration. In one aspect the invention relates to method and apparatus for dehydrating a fluid by passing in contact with a bed of spent catalyst. In another aspect, the invention relates to process and apparatus for carrying out a chemical reaction wherein regenerated catalyst is cooled with a gas which has been dehydrated by passing through a cool bed of spent catalyst.

In many instances, it is necessary or desirable to remove moisture from a fluid. In carrying out catalytically promoted chemical reactions, often it is necessary to cool a regenerated catalyst by passing a cooling gas in contact with the warm bed. In those instances in which moisture is damaging to the catalyst, the moisture must be removed from the gas prior to contact with the catalyst.

An object of our invention is to dehydate a fluid.

Another object of our invention is to cool a regenerated catalyst bed efficiently.

Another object of our invention is to carry out a catalytically promoted chemical reaction including rengeneration and cooling of the catalyst.

Other aspects, objects and the advantages of our invention are apparent in the written description, the drawing and the claims.

According to our invention, a fluid is dried by passing the fluid in contact with a spent catalyst which acts as a desiccant. We have found that a catalyst for the disproportionation of olefins, more especially a catalyst comprising an oxide of molybdenum on an alumina base, is suitable for drying a gas. Further according to our invention, a hot regenerated catalyst is cooled by passing a cooling gas through a quantity of cool spent catalyst and then through the hot regenerated catalyst. We have found that a hot regenerated catalyst can be cooled by passing a quantity of a cooling gas through a first bed of desiccant and through a cool bed of spent catalyst to dry the gas, passing the dried gas through the hot regenerated catalyst to cool the bed, thus heating the gas, and subsequently using the heated gas to regenerate a spent desiccant. In this manner, the drying of the cooling gas is accomplished very efficiently. Although it is not practical to store a dried cooling gas, by the practice of our invention the available dehydrating capacity is very efficiently used. Where a dried gas is used to cool the catalyst bed and subsequently vented without further utilization, it is necessary to dry the entire amount of gas necessary for cooling each time a bed is regenerated. By the practice of our invention, the drying capacity of cool spent catalyst is utilized to dry the cooling gas, and the drying capacity of the vented warm cooling gas is utilized to regenerate a spent desiccant bed.

Further according to our invention there is provided a process for disproportionating an olefin hydrocarbon comprising passing a stream of olefin to be disproportionated through a first bed of disproportionation catalyst until the catalyst of the first bed needs regeneration, cooling a second bed of disproportionation catalyst which has been heated during the regeneration process, by passing a stream of cooling gas through a third bed of spent disproportionation catalyst for dehydrating the gas, passing the resulting dehydrated cooling gas through the second bed, and subsequently regenerating the catalyst of the third bed by heating while passing the stream of olefin through the first bed. The steps are repeated by diverting the stream of olefin through the second bed when the first bed is spent sufficiently to require regeneration, cooling the third bed by passing a stream of the cooling gas through the first bed for dehydration and passing the resulting dehydrated cooling gas through the third bed, and subsequently regenerating the catalyst of the first bed by heating while passing the stream of olefin through the second bed. The process is continued by diverting the stream of olefin through the third bed when the catalyst of the second bed is spent sufficiently to require regeneration, cooling the first bed by passing a stream of cooling gas through the second bed for dehydration of the gas and passing the resulting dehydrated cooling gas through the first bed, and subsequently regenerating the second bed by heating, while passing the stream of olefin through the third bed. The process is continued by diverting the stream of olefin through the regenerated bed when the third bed is spent sufficiently to require regeneration and repeating the steps as required. The regenerated bed to which the stream of olefin is diverted when the third bed is spent can be the first bed, in which instance a complete cycle of the process has been completed, and the process is continued by repeating the steps with the three catalyst beds. On the other hand, where there are more than three catalyst beds available, the regenerated bed to which the stream is diverted is a fourth bed and the process is continued until all of the beds have been used and then the stream is diverted back to the first bed. More than one catalyst bed can be in use for disproportionation at one time.

Where it is necessary to provide additional drying capacity above that available in the spent catalyst beds, additional desiccant beds are provided and the warm dry gas leaving the cooled regenerated catalyst is utilized to dry a spent desiccant bed at the same time that an activated desiccant bed is used to dry the gas either before or after the gas is dried by the spent catalyst. This results in a minimum use of extra desiccant regeneration.

Further according to our invention, there is provided apparatus for carrying out a catalytic process, comprising a plurality of reactors and desiccant vessels, means to connect each reactor selectively into a reactant inlet and product outlet, with each other, and with each of the desiccant vessels and to connect each vessel selectively into a cooling gas inlet and vent and with each of the reactors. In operation, at least one of the reactors is on stream with the reactant, at least one of the desiccant vessels contains activated desiccant and is connected in sequence with a reactor containing cool spent catalyst, a reactor containing hot regenerated catalyst and another vessel containing spent desiccant, the cooling gas flowing through the regenerated catalyst, and flowing through the spent desiccant after passing through the regenerated catalyst. The cooling gas passes in sequence through the activated desiccant, the spent catalyst, the regenerated catalyst and the spent desiccant or in sequence through the spent catalyst, the activated desiccant, the regenerated catalyst and the spent desiccant.

By disproportionation is meant the conversion of a hydrocarbon into similar hydrocarbons of both higher and lower number of carbon atoms per molecule. The process is especially applicable to non-tertiary-base aliphatic olefins, that is, an olefin having no carbon-chain branching at a doubly bound carbon atom, having from three to six carbon atoms per molecule. When propylene is disproportionated approximately equimolar quantities of ethylene and butenes are produced.

Suitable disproportionation catalysts for the practice of our invention includes oxides, sulfides and carbonyls of molybdenum and tungsten, supported on silica, alumina, or silica alumina, or any other suitable disproportionation catalyst. Operating conditions suitable for the catalyst and feed are selected.

Details of some suitable disproportionation processes are given in copending applications Ser. No. 307,371, Hecklesberg, filed Sept. 9, 1963 now abandoned; Ser. No. 312,209, Banks, filed Sept. 27, 1963 now Patent No. 3,261,879; Ser. No. 336,624, Hecklesberg, filed Jan. 9, 1964; and Ser. No. 94,996, Banks, filed Mar. 13, 1961.

In the drawing, there are illustrated three reactors 11, 12 and 13 and a pair of desiccant vessels 14 and 16. A conduit 17 supplies a reactant from a source (not shown) to a header 18 which is connected to the inlet ends of reactors 11, 12 and 13 through valves 21, 22 and 23, respectively. An outlet conduit 24 for reaction products from the reactors communicates with a header 26 which is connected to the outlet ends of reactors 11, 12 and 13 through valves 27, 28 and 29, respectively. Means are provided to supply a cooling gas through preliminary preparation means 31, through conduit 32 into header 33, which is connected with desiccant vessels 14 and 16 through valves 34 and 36, respectively.

A header 37 is connected with the outlet ends of reactors 11, 12 and 13 through valves 38, 39 and 41. A header 42 is connected to the inlet ends of reactors 11, 12 and 13 through valves 43, 44 and 46, respectively. A header 47 is connected to the inlet ends of reactors 11, 12 and 13 through valves 48, 49 and 51, respectively. An outlet conduit 52 is connected to the outlet ends of desiccant vessels 14 and 16 through a header 53 which is connected therewith through valves 54 and 56, respectively. Header 57 is connected with the outlet ends of desiccant vessels 14 and 16 through valves 58 and 59, respectively. Header 61 is connected with the inlet ends of desiccant vessels 14 and 16 through valves 62 and 63, respectively. Header 47 is connected with header 61 through conduit 66 while header 42 is connected with header 57 through conduit 67.

The coolant air is pretreated by apparatus 31 which comprises, for example, an air compressor, an air cooler, a mechanical separation means or water knockout, and an oil vapor absorber.

In operation, with the reactant flowing through conduit 17 and header 18 through valve 21 to vessel 11, and the reaction products through valve 27, header 26 and conduit 24, and with the catalyst in reactor 12 being cool spent catalyst and the catalyst in reactor 13 hot regenerated catalyst, air is supplied through conduit 32 and header 33 through valve 34 and desiccant vessel 14, containing activated desiccant, valve 58, header 57, conduit 67, header 42 and valve 44 through reactor 12, valve 39, header 37 and valve 41 into reactor 13, thence through valve 51, header 47, conduit 66, header 61, valve 63, vessel 16 containing spent desiccant, valve 56, header 53 and conduit 52. In this manner, the air is dried by passing through the activated desiccant in vessel 14 and the spent catalyst in reactor 12, cools the catalyst in reactor 13 and is thereby heated but without the addition of moisture, and then passes through the spent desiccant in vessel 16 and is vented to conduit 52. When the catalyst in reactor 13 reaches the desired temperature the treatment is discontinued. Immediately thereafter, the regeneration of the catalyst in reactor 12 begins. This treatment comprises the treatment of the catalyst with gas at high temperature. Means for the regeneration treatment are not illustrated but can readily be supplied by one skilled in the art. For example, an additional inlet and outlet header can be supplied to reactors 11, 12 and 13 with separate valve means for inlet and outlet of the regeneration gas. When the catalyst in reactor 11 needs regeneration, the regeneration treatment of the catalyst in reactor 12 will have been completed and the flow of reactant is diverted by closing valve 21, opening valve 23, closing valve 27 and opening valve 29. The various valves are switched so that the flow of air from conduit 32 is through header 33, valve 36, vessel 16, valve 59, header 57, conduit 67, header 42, valve 43, reactor 11, valve 38, header 37, valve 39, reactor 12, valve 49, header 47, conduit 66, header 61, valve 62, vessel 14, valve 54, header 53, and conduit 52. Immediately after the catalyst in reactor 12 is cooled, the regeneration of the catalyst in reactor 11 is commenced.

In a similar manner, when the catalyst in reactor 13 needs regeneration, valve 23 is closed and valve 22 is opened permitting the flow of the reactant through reactor 12. Valve 29 is closed and valve 28 opened permitting the reaction products to flow through header 26 and conduit 24. To cool the catalyst in reactor 11, air flows through valve 34, vessel 14, valve 58, header 57, conduit 67, header 42, valve 46, reactor 13, valve 41, header 37, valve 38, reactor 11, valve 48, conduit 66, header 61, valve 63, vessel 16, valve 56, header 53 and conduit 52. As soon as the catalyst in reactor 11 is cooled, the flow of air is discontinued and the catalyst in reactor 13 is regenerated. It will be seen that the above sequence of steps can be continued with each reactor in turn, alternating the flow through the desiccant vessels 14 and 16 so that the cooler air is first passed through an activated bed and through a spent bed. It will also be recognized that the invention can be practiced with more than three reactors and more than two desiccant vessels.

Although the valve means have been illustrated as individual valves on each of the separate headers, it will be recognized that other valve means such as multi-way valves, can be utilized. For example, valves 48, 21 and 43 can be replaced by a single multi-way valve as can valves 49, 22 and 44.

Our invention is especially applicable to catalytic reactions wherein the reaction proceeds at a relatively low temperature and regeneration is done at a relatively high temperature and wherein the low temperature spent catalyst can be used as a desiccant, more especially in those instances wherein moisture is detrimental to the catalyst activity or physical condition. Our invention is particularly applicable to a system of olefin disproportionation utilizing a catalyst comprising alumina and oxides of tungsten or an oxide of molybdenum.

EXAMPLE

In an example, according to our invention, wherein the system illustrated in the drawing is operated as described above, the catalyst comprises 10 percent by weight of molybdenum oxide supported on 90 percent by weight of alumina. The desiccant used in $Al_2O_3$. The composition of the feed stream and the product stream at various times during the run are given in Table I. Each of the catalyst beds contain 6500 pounds of catalyst and the stream is passed through the fixed bed at 33,000 pounds of propylene per hour, a weight hourly space velocity of 5. The disproportionation reaction is carried out at 325° F. and 450 p.s.i.g., the run continuing for 10 hours. Regeneration is accomplished by contacting the spent catalyst with air diluted with nitrogen to an oxygen content of 0.7 mol percent and the flow of regeneration gas is controlled to maintain a temperature of 1100° F. maximum. The regeneration is accomplished in 5 hours.

Air is used as the cooling gas. The air enters means 31 at the rate of 750 standard cubic feet per minute and, after being treated therein by compression, cooling and a water knockout, this air has a moisture content of about 20,000 p.p.m. (dew point 60° F.). After passing through the desiccant vessel, the air has a moisture content of about 200 p.p.m. (dew point −40° F.) and this is lowered to about 2 p.p.m. (dew point −100° F.) in passing through the spent catalyst bed. When the air passes through the regenerated catalyst, its temperature is raised, the exact temperature of the air being a function of the temperature of the bed, which gradually is lowered by the flow of air therethrough to about 325° F. in 3½ hours. The heated air stream completely reactivates the spent desiccant as it passes therethrough. Each desiccant vessel contains 4800 pounds of desiccant.

It will be recognized that the drawing is diagrammatic and that many items useful in a commercial operation, such as pumps, control equipment, etc. are not shown. Such additional equipment can readily be supplied, where needed, by one skilled in the art. Our invention is not limited to the use of the particular flow paths illustrated. The flow through the various reactors and vessels can be the direction desired and modified or additional arrangement of headers, valves, etc. can be used to accomplish the desired direction of flow through each reactor or vessel at each stage in the process.

Reasonable variation and modification are possible within the scope of our invention which sets forth method and apparatus for dehydration and for carrying out a catalytic chemical reaction.

We claim:
1. A process for cooling a hot regenerated catalyst which comprises the steps of:
   passing a quantity of a cooling gas through a first bed of desiccant and a cool bed of spent catalyst to dry said gas;
   subsequently passing said dried gas through a hot bed of regenerated catalyst, thereby cooling said regenerated catalyst and heating said gas; and
   subsequently passing said heated gas through a bed of spent desiccant to regenerate said spent desiccant.

2. A process for disproportionating an olefin hydrocarbon, which comprises:
   passing a stream of olefin to be disproportionated through a first bed of disproportionation catalyst until the catalyst of said first bed needs regeneration;
   cooling a second bed of disproportionation catalyst which has been heated for regeneration by passing a stream of cooling gas through a third bed of spent disproportionation catalyst for dehydration of said gas and passing the resulting dehydrated cooling gas through said second bed, and subsequently regenerating the catalyst of said third bed by heating, while passing said stream of olefin through said first bed;
   diverting said stream of olefin through said second bed when said first bed is spent sufficiently to require regeneration;
   cooling said third bed by passing a stream of cooling gas through said first bed for dehydration of said gas and passing the resulting dehydrated cooling gas through said third bed, and subsequently regenerating the catalyst of said first bed by heating, while passing said stream of olefin through said second bed;
   diverting said stream of olefin through said third bed when the catalyst of said second bed is spent sufficiently to require regeneration;
   cooling said first bed by passing a stream of cooling gas through said second bed for dehydration of said gas and passing the resulting dehydrated cooling gas through said first bed, and subsequently regenerating said second bed by heating, while passing said stream of olefin through said third bed;
   diverting said stream of olefin through a regenerated and cooled bed when said third bed is spent sufficiently to require regeneration; and
   repeating the above steps as required.

3. A process for disproportionating an olefin hydrocarbon, which comprises:
   passing a stream of olefin to be disproportionated through a first bed of disproportionation catalyst until the catalyst of said first bed needs regeneration;
   cooling a second bed of disproportionation catalyst which has been heated for regeneration by passing a stream of cooling gas through a first desiccant bed and through a third bed of spent disproportionation catalyst for dehydration of said gas and passing the resulting dry cooling gas through said second bed and then through a second bed of desiccant for regeneration of said second bed of disiccant, and subsequently regenerating the catalyst of said third bed of catalyst by heating, while passing said stream of olefin through said first bed of catalyst;
   diverting said stream of olefin through said second bed of catalyst when said first bed of catalyst is spent sufficiently to require regeneration;
   cooling said third bed of catalyst by passing a stream of cooling gas through a bed of activated desiccant and through said first bed of catalyst for dehydration of said gas and passing the resulting dehydrated cooling gas through said third bed of catalyst and then through a bed of spent desiccant, and subsequently regenerating the catalyst of said first bed of catalyst by heating, while passing said stream of olefin through said second bed of catalyst;
   diverting said stream of olefin through said third bed of catalyst when the catalyst of said second bed of catalyst is spent sufficiently to require regeneration;
   cooling said first bed of catalyst by passing a stream of cooling gas through a bed of activated desiccant and through said second bed of catalyst for dehydration of said gas and passing the resulting dehydrated cooling gas through said first bed of catalyst and then through a bed of spent desiccant, and subsequently regenerating said second bed of catalyst by heating, while passing said stream of olefin through said third bed of catalyst; and
   diverting said stream of olefin through a regenerated and cooled bed of catalyst when said third bed of catalyst is spent sufficiently to require regeneration.

4. The process of claim 3 wherein said disproportionation catalyst comprises an oxide of molybdenum supported on alumina.

References Cited

UNITED STATES PATENTS

| | | | |
|---|---|---|---|
| 2,178,584 | 11/1939 | Grosse | 260—680 |
| 2,406,112 | 8/1946 | Schulze | 260—680 |
| 2,749,287 | 6/1956 | Kirschenbaum | 252—416 |
| 2,755,230 | 7/1956 | Guernsey | 55—35 |
| 2,842,482 | 7/1958 | Voorhies et al. | 208—88 |
| 2,845,409 | 7/1958 | Pennington et al. | 252—416 |
| 3,261,879 | 7/1966 | Banks | 260—683 |

DELBERT E. GANTZ, *Primary Examiner.*

C. E. SPRESSER, *Assistant Examiner.*